United States Patent
Komura et al.

(10) Patent No.: US 11,016,356 B2
(45) Date of Patent: May 25, 2021

(54) DISPLAY DEVICE

(71) Applicant: Japan Display Inc., Tokyo (JP)

(72) Inventors: Shinichi Komura, Tokyo (JP); Youichi Asakawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/012,403

(22) Filed: Sep. 4, 2020

(65) Prior Publication Data

US 2020/0400983 A1 Dec. 24, 2020

Related U.S. Application Data

(63) Continuation of application No. PCT/JP2019/000360, filed on Jan. 9, 2019.

(30) Foreign Application Priority Data

Mar. 8, 2018 (JP) .............................. JP2018-042219

(51) Int. Cl.
*G02F 1/139* (2006.01)
*G02F 1/1333* (2006.01)
*G02F 1/1335* (2006.01)
*G02F 1/13357* (2006.01)
*G02F 1/13363* (2006.01)

(52) U.S. Cl.
CPC ........ *G02F 1/1393* (2013.01); *G02F 1/13363* (2013.01); *G02F 1/133305* (2013.01); *G02F 1/133514* (2013.01); *G02F 1/133536* (2013.01); *G02F 1/133621* (2013.01); *G02F 1/133302* (2021.01)

(58) Field of Classification Search
CPC .................................................... G02F 1/1393
See application file for complete search history.

(56) References Cited

U.S. PATENT DOCUMENTS

| 2005/0062906 | A1  | 3/2005  | Ishizaki |
| 2018/0081096 | A1* | 3/2018  | Claes .................... G02B 5/201 |
| 2018/0356682 | A1* | 12/2018 | Kang ................ G02F 1/133617 |

FOREIGN PATENT DOCUMENTS

JP 2004-145327 A 5/2004

\* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a display device comprises a color filter layer, an illumination device and a selection layer. The illumination device illuminates the color filter layer with mixed light including first and second components. The color filter layer includes first and second filters. The selection layer includes a phase element layer including first and second phase elements, and first and second polarizers. The first phase element changes a polarization state of the mixed color light such that the first component is transmitted through the second polarizer. The second phase element changes a polarization state of the mixed color light such that the second component is transmitted through the second polarizer.

20 Claims, 5 Drawing Sheets

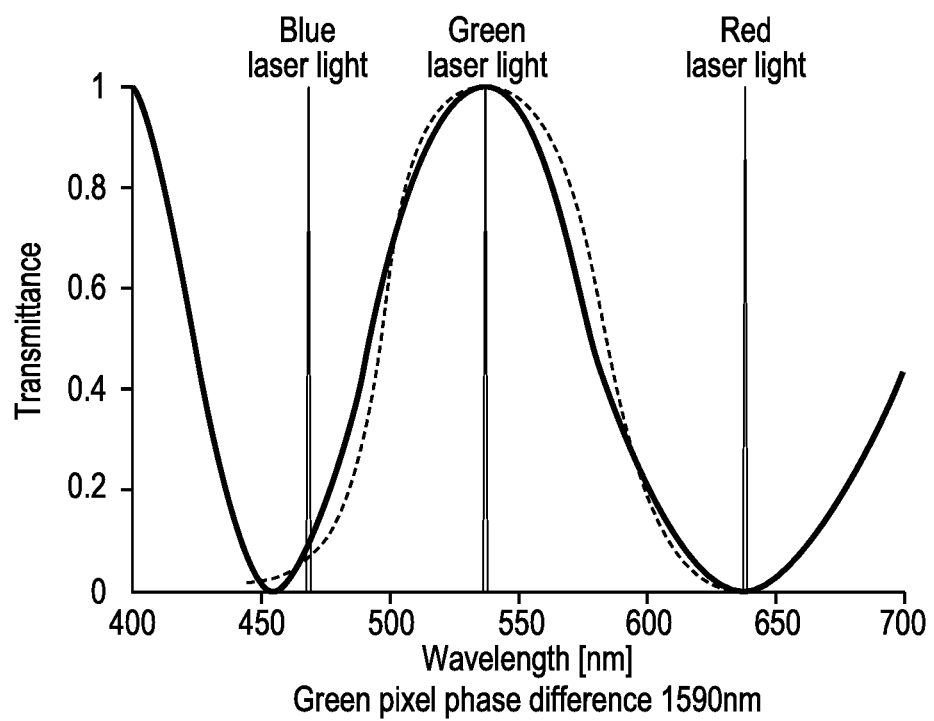
F I G. 5
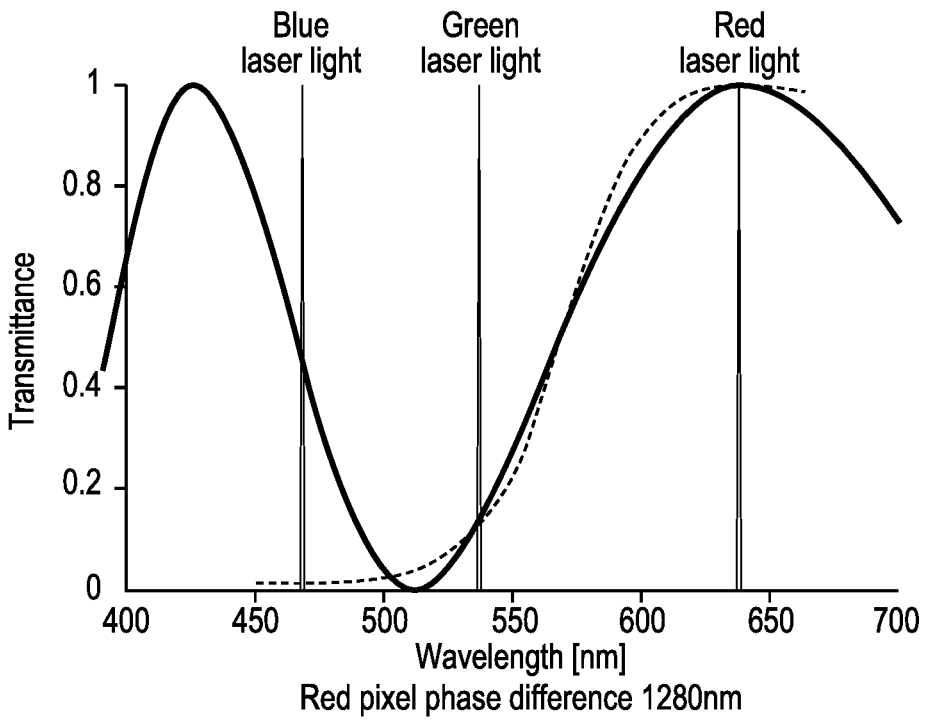
F I G. 6

DISPLAY DEVICE

CROSS-REFERENCE TO RELATED APPLICATIONS

This application is a Continuation Application of PCT Application No. PCT/JP2019/000360, filed Jan. 9, 2019 and based upon and claiming the benefit of priority from Japanese Patent Application No. 2018-042219, filed Mar. 8, 2018, the entire contents of all of which are incorporated herein by reference.

FIELD

Embodiments described herein relate generally to a display device including a color filter.

BACKGROUND

A display device includes an electro-optic layer such as a liquid crystal layer that selectively transmits light, and a color filter layer that colors the light transmitted through the electro-optic layer. For example, a red filter that colors light red absorbs green and blue components contained in white light and transmits red components only. That is, green and blue components that strike to a red filter are not used to display an image but absorbed. Similarly, blue and red components that strike to a green filter or red and green components that strike to a blue filter are not used to display an image but absorbed.

A liquid crystal display device including a selective reflection cholesteric liquid crystal filter is proposed which transmits only light having a desired wavelength and actively reflects light having a wavelength other than the transmitted light wavelength toward the backlight in order to improve use efficiency of the light. The selective reflection cholesteric liquid crystal filter is a multilayer film into which an absorption color filter and a cholesteric color filter are combined, and can convert incident light into circularly polarized light according to spiral pitches of cholesteric liquid crystal and then reflect the circularly polarized light.

However, the above selective reflection cholesteric liquid crystal filter is difficult to form as designed because its manufacturing process is complicated. Even though it can be formed, its display device will become expensive.

BRIEF DESCRIPTION OF THE DRAWINGS

FIG. 5 is a graph schematically showing transmission characteristics of a green filter and a wavelength selection layer in a green pixel.

FIG. 6 is a graph schematically showing transmission characteristics of a red filter and a wavelength selection layer in a red pixel.

DETAILED DESCRIPTION

Figure 1:
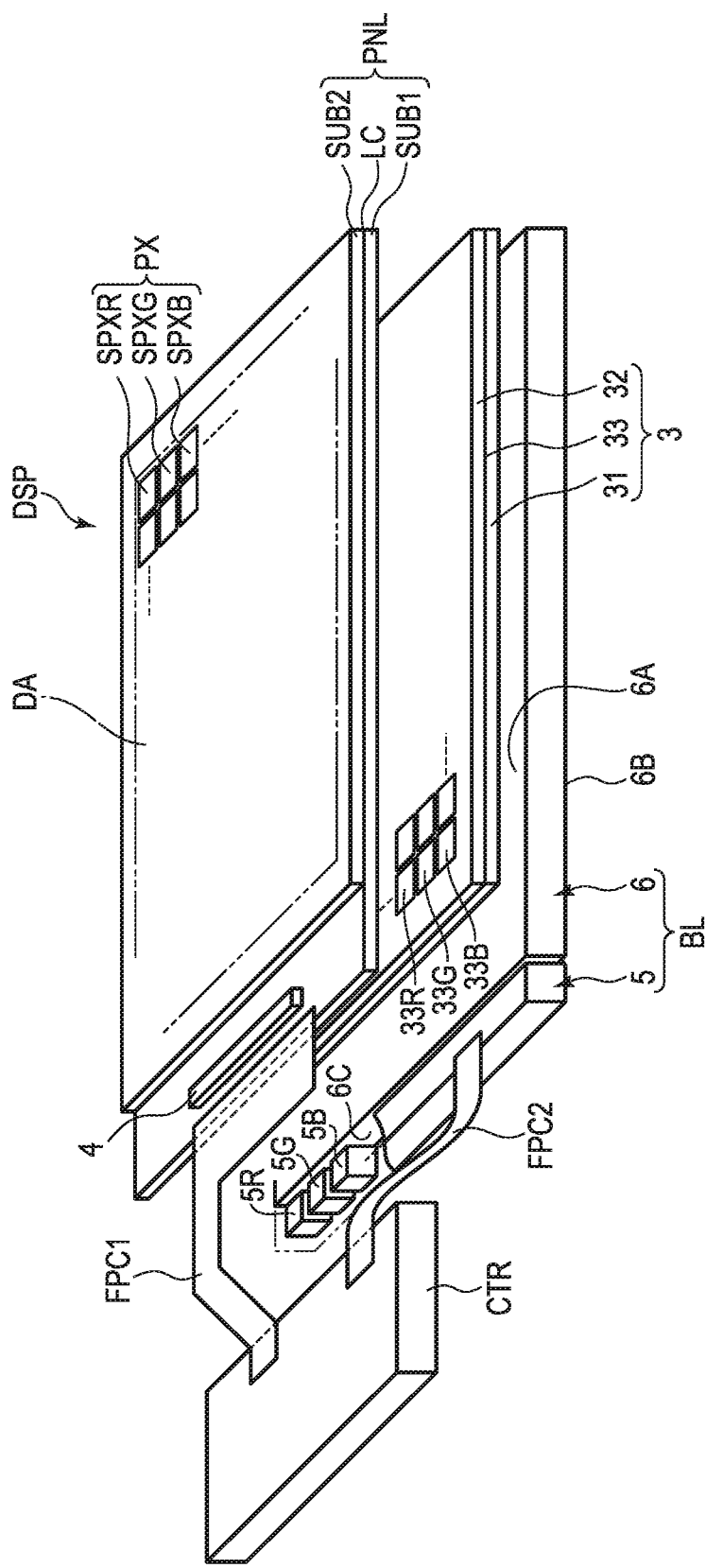
FIG. 1 is a perspective view showing a schematic configuration of a display device common to the embodiments.

In general, according to one embodiment, a display device comprises a color filter layer, an illumination device and a wavelength selection layer. The illumination device illuminates the color filter layer with mixed color light including a first color component and a second color component. The wavelength selection layer is interposed between the illumination device and the color filter layer. The color filter layer includes a first color filter which transmits the first color component and absorbs the second color component and a second color filter which transmits the second color component and absorbs the first color component. The wavelength selection layer includes a phase element layer, a first polarizer interposed between the illumination device and the phase element layer, and a second polarizer interposed between the phase element layer and the color filter layer. The phase element layer includes a first color phase element located in a position corresponding to the first color filter and a second color phase element located in a position corresponding to the second color filter. The first color phase element changes a polarization state of the mixed color light, which strikes to the first phase element through the first polarizer, such that the first color component is transmitted through the second polarizer. The second color phase element changes a polarization state of the mixed color light, which strikes to the second phase element through the first polarizer, such that the second color component is transmitted through the second polarizer.

The foregoing configuration can provide a display device that is increased in use efficiency of light and improved in price competitiveness.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the drawings are schematically illustrated, compared to the actual modes. However, the schematic illustration is merely an example, and adds no restrictions to the interpretation of the invention. In each of the drawings, same or similar elements may not be denoted by reference numerals. Besides, in the specification and drawings, elements that fulfill same or similar functions are denoted by like reference numerals and their detailed descriptions may be omitted.

In the present specification, the expressions that "α includes A, B or C", "α includes any of A, B and C" and "α includes one selected from the group consisting of A, B and C" do not exclude the case where α includes a plurality of combinations of A to C unless otherwise specified. In addition, these expressions do not exclude the case where α includes other elements. In each embodiment, a liquid crystal display device DSP is disclosed as an example of a display device. However, each embodiment does not preclude each individual technical concept disclosed in the embodiment from being applied to display devices of different types.

The liquid crystal display device DSP can be used for various devices such as a smartphone, a tablet, a mobile phone, a personal computer, a television receiver, a vehicle-mounted device, a game console and a wearable terminal.

First, a configuration common to the embodiments will be described with reference to FIG. 1. FIG. 1 is a perspective view showing a schematic configuration of a liquid crystal display device DSP. The liquid crystal display device DSP includes a display panel PNL, an illumination device (backlight) BL that irradiates the back of the display panel PNL with light, a wavelength selection layer 3 interposed between the display panel PNL and the illumination device BL, a control module CTR that controls the operations of the display panel PNL and the illumination device BL, a driver IC chip 4 that drives the display panel PNL, and flexible circuit boards FPC1 and FPC2 that transmit a control signal of the control module CTR to the display panel PNL and the illumination device BL.

The display panel (liquid crystal cell) PNL includes a first substrate (array substrate) SUB1, a second substrate (counter-substrate) SUB2 opposed to the first substrate SUB1, and a liquid crystal layer (second liquid crystal layer) LC interposed between the first and second substrates SUB1 and SUB2. The liquid crystal layer LC is an example of an electro-optic layer that selectively transmits light. The display panel PNL has a display area DA for displaying an image. The display panel PNL includes a plurality of pixels PX arranged in matrix in the display area DA.

The driver IC chip 4 is mounted on the first substrate SUB1, for example. Note that the driver IC chip 4 may be mounted on the control module CTR or the like. The flexible circuit board FPC1 connects the first board SUB1 and the control module CTR. The flexible circuit board FPC2 connects the illumination device BL and the control module CTR.

The control module CTR sequentially receives image data for one frame to be displayed in the display area DA from the main board or the like of an electronic device mounted with the liquid crystal display device DSP. The image data includes information such as the display color of each of the pixels PX. The control module CTR supplies the driver IC chip 4 with a signal for driving each of the pixels PX based on the received image data. The control module CTR supplies the illumination device BL with a signal for driving a light source 5 based on the received image data.

The illumination device BL is opposed to the first substrate SUB1 of the display panel PNL. The illumination device BL includes a light source 5 that emits light and a light guide 6 to which light strikes from the light source 5. The light source 5 includes, for example, a green laser device 5G that emits green laser light, a red laser device 5R that emits red laser light, and a blue laser device 5B that emits blue laser light.

Note that the light source 5 is not limited to a laser device such as a laser semiconductor (laser diode), but may be a light-emitting diode (LED) and the like. Green light emitted from a green LED has a predetermined bandwidth in a green wavelength range (e.g., 490 through 590 nm).

Red light emitted from a red LED has a predetermined bandwidth in a red wavelength range (e.g., 590 through 780 nm). Blue light emitted from a blue LED has a predetermined bandwidth in a blue wavelength range (e.g., 380 through 490 nm). From the viewpoint of use efficiency of light to be described later, however, the laser devices 5G, 5R and 5B that emit laser light are particularly suitable for the present embodiment.

The light guide 6 has an emission surface (first main surface) 6A opposed to the first substrate SUB1, a reflection surface (second main surface) 6B opposite to the emission surface 6A, and an incident surface (end surface) 6C between the emission surface 6A and the reflection surface 6B. A plurality of light sources 5 are arranged along the incident surface 6C. The light incident on the incident surface 6C from the light source 5 propagates through the light guide 6 while being reflected by the reflection surface 6B, and is emitted from the emission surface 6A.

The illumination device BL irradiates the back of the display panel PNL with white light including a green component (G), a red component (R) and a blue component (B). The green component (G), red component (R) and blue component (B) are examples of first to third color components, and the white light is an example of mixed color light including light of two or more color components.

Figure 2:
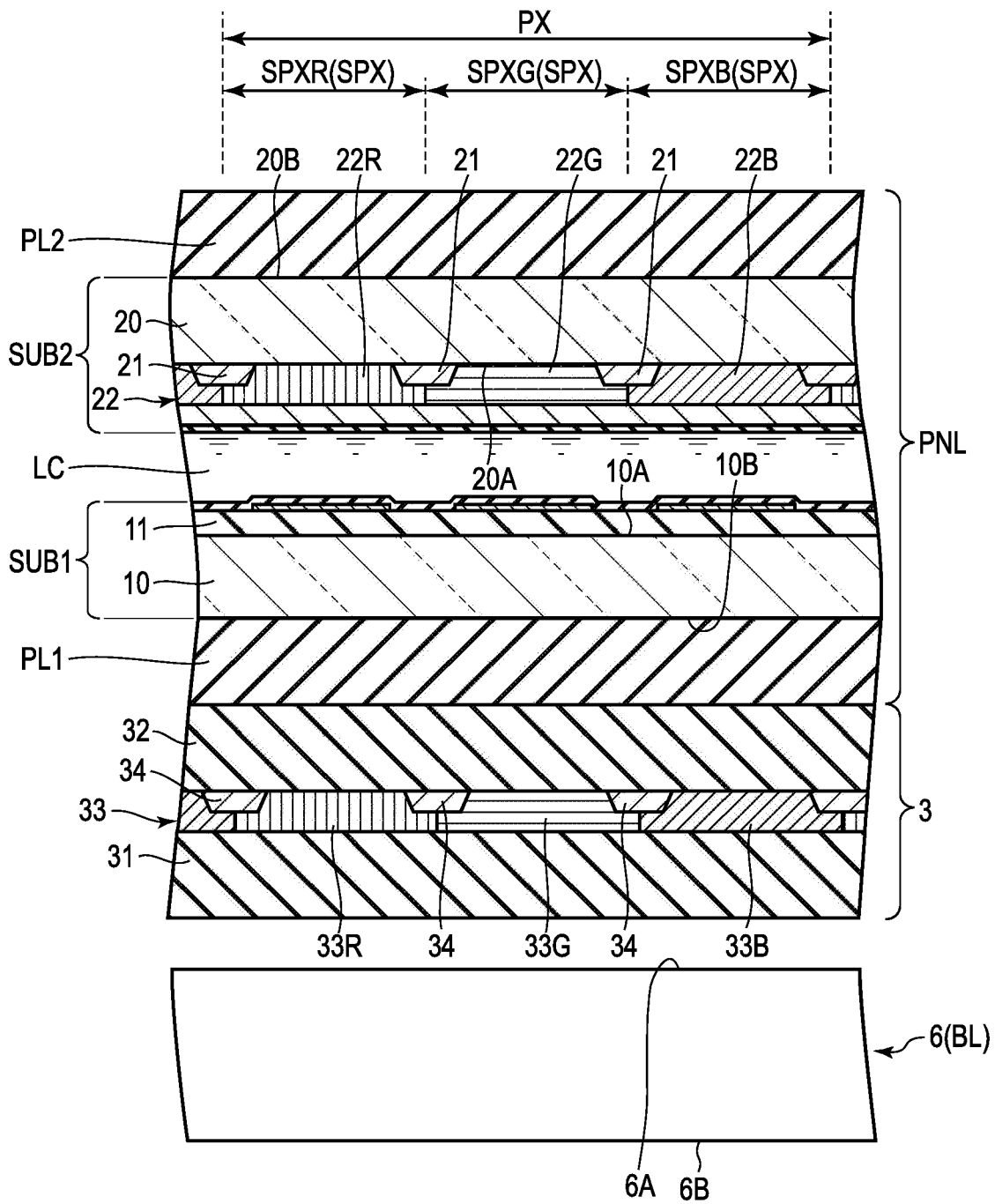
FIG. 2 is a sectional view showing a sectional structure of a display panel and a wavelength selection layer shown in FIG. 1.

FIG. 2 is a sectional view showing a sectional structure of the display panel PNL and the wavelength selection layer 3. The first and second substrates SUB1 and SUB2 of the display panel PNL include their respective first and second transparent bases 10 and 20 having translucency. In order to allow the light transmitted through the wavelength selection layer 3 to strike to its corresponding color filters 22G, 22R and 22B with high positional accuracy, the first transparent base 10 preferably has a thin thickness of, e.g., 5 to 10 μm. The first and second transparent bases 10 and 20 are formed of, for example, a translucent resin material to thin the bases easily. Note that the first and second substrates SUB1 and SUB2 may be formed of a glass material.

The first transparent base 10 has a first surface 10A and a second surface 10B opposed to the first surface 10A. The second transparent base 20 has a third surface 20A and a fourth surface 20B opposed to the third surface 20A. The first and second substrates SUB1 and SUB2 are stuck together with the first surface 10A and the third surface 20A opposed to each other. A liquid crystal layer LC is sealed between the first and second substrates SUB1 and SUB2.

First and second polarizers PL1 and PL2 are disposed on their respective display and back sides of the display panel PNL. In the example shown in FIG. 2, the first polarizer PL1 on the back side is stuck on the second surface 10B of the first substrate SUB1. The second polarizer PL2 on the display side is stuck on the fourth surface 20B of the second substrate SUB2.

The first substrate SUB1 includes, for example, a TFT layer 11 that applies a voltage to the liquid crystal layer LC, in addition to the first transparent base 10. The TFT layer 11 is formed on the first surface 10A of the first transparent base 10, and includes a pixel electrode, a common electrode, a scanning signal line, a video signal line, a thin-film transistor, various insulating films interposed therebetween, and the like.

The second substrate SUB2 includes a light-shielding layer 21, a color filter layer 22 and the like, in addition to the second transparent base 20. The light-shielding layer 21 is formed on the third surface 20A of the second transparent base 20. The foregoing pixels PX include, for example, sub-pixels SPX (a green pixels SPXG, a red pixel SPXR and a blue pixel SPXB) corresponding to green, red and blue, and these sub-pixels SPX are partitioned by the light-shielding layer 21.

The color filter layer 22 is formed on the third surface 20A of the second transparent base 20 to cover the third surface 20A and the light-shielding layer 21. Note that the color filter layer 22 may be formed on the fourth surface 20B and the first substrate SUB1. The light incident on the back of the display panel PNL is selectively transmitted through the liquid crystal layer LC and strikes into the color filter layer 22.

The color filter layer 22 includes a green filter 22G disposed in the green pixel SPXG, a red filter 22R disposed in the red pixel SPXR and a blue filter 22B disposed in the blue pixel SPXB. The green filter transmits a green component (G) contained in the incident light and absorbs a red component (R) and a blue component (B).

Similarly, the red filter 22R transmits a red component (R) contained in the incident light and absorbs a blue component (B) and a green component (G). The blue filter 22B transmits a blue component (B) contained in the incident light and absorbs a green component (G) and a red component (R). As a result, the incident light becomes visible light having a color corresponding to the color filter layer 22 and reaches the second polarizer PL2.

One of the features of the present embodiment is that the wavelength selection layer (selective reflection layer) 3 is interposed between the illumination device BL and the color filter layer 22. The wavelength selection layer 3 includes first and second reflective polarizers 31 and 32, and a phase element layer 33 interposed between them. The first reflective polarizer (first polarizer) 31 is opposed to the emission surface 6A of the light guide 6 of the illumination device BL. The second reflective polarizer (second polarizer) 32 is stuck on the first polarizer PL1 of the display panel PNL. In the present embodiment, the reflective polarizers are used based on the premise that light is reused; however, when light is not reused, an absorption type polarizer may be used in place of the reflective polarizers.

In the example shown in FIG. 2, the first and second reflective polarizers 31 and 32 are arranged under crossed nicols. Note that the first and second reflective polarizers 31 and 32 may be arranged under parallel nicols. The phase element layer 33 includes a green phase element (first color phase element) 33G, a red phase element (second color phase element) 33R, and a blue phase element (third color phase element) 33B.

The green phase element 33G is located in a position where it is superposed on the green pixel SPXG (green filter 22G) in the thickness direction of the display panel PNL. Similarly, the blue phase element 33B is located in a position where it is superposed on the blue pixel SPXB (blue filter 22B), and the red phase element 33R is located in a position where it is superposed on the red pixel SPXR (red filter 22R). A light-shielding layer 34 may be formed between adjacent phase elements 33G, 33R and 33B.

One example of the phase elements 33G, 33R and 33B is a phase plate (wave plate) that provides linearly polarized light. Each phase element has a product (And) (referred to as a phase difference (retardation) hereinafter in this embodiment) of birefringence anisotropy (Δn) and the thickness (d) of the phase element, the birefringence anisotropy (Δn) varying from phase element to phase element. For example, the green phase element 33G is a phase plate whose phase difference is 1590 nm, the red phase element 33R is a phase plate whose phase difference is 1280 nm, and the blue phase element 33B is a phase plate whose phase difference is 1400 nm.

The phase element layer 33 is not limited to a phase plate but may be a liquid crystal layer (first liquid crystal layer). When the phase element layer 33 is a liquid crystal layer, the green phase element 33G is an area superposed on the green pixel SPXG in the thickness direction of the display panel PNL, the red phase element 33R is an area superposed on the red pixel SPXR in the thickness direction of the display panel PNL, and the blue phase element 33B is an area superposed on the blue pixel SPXB in the thickness direction of the display panel PNL.

Figure 3:
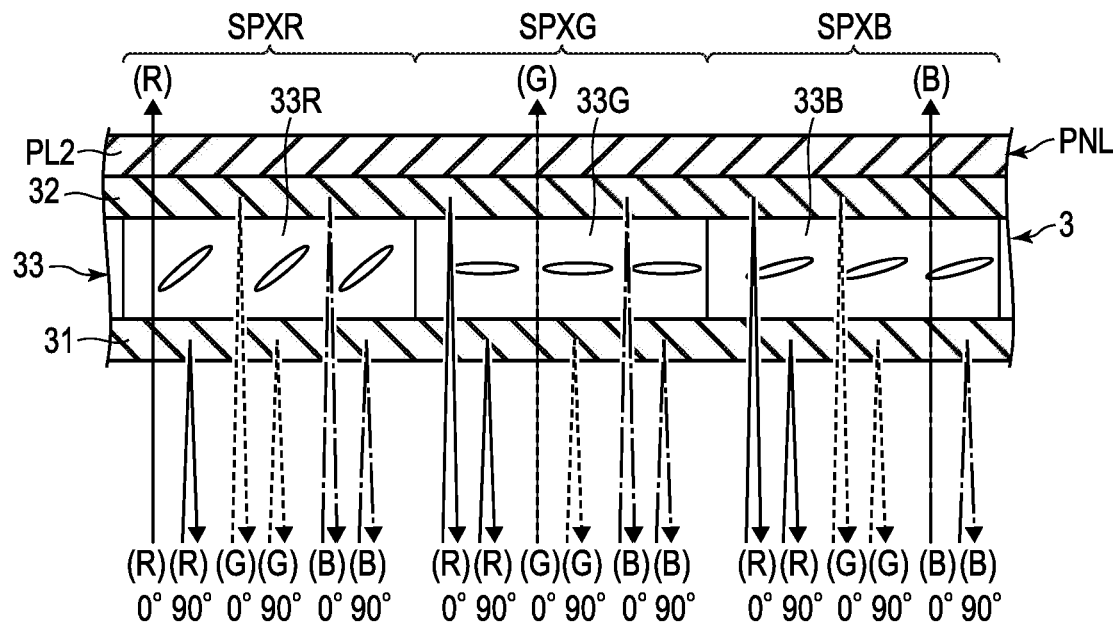
FIG. 3 is a sectional view showing a first modification to the wavelength selection layer shown in FIG. 2.
Figure 4:
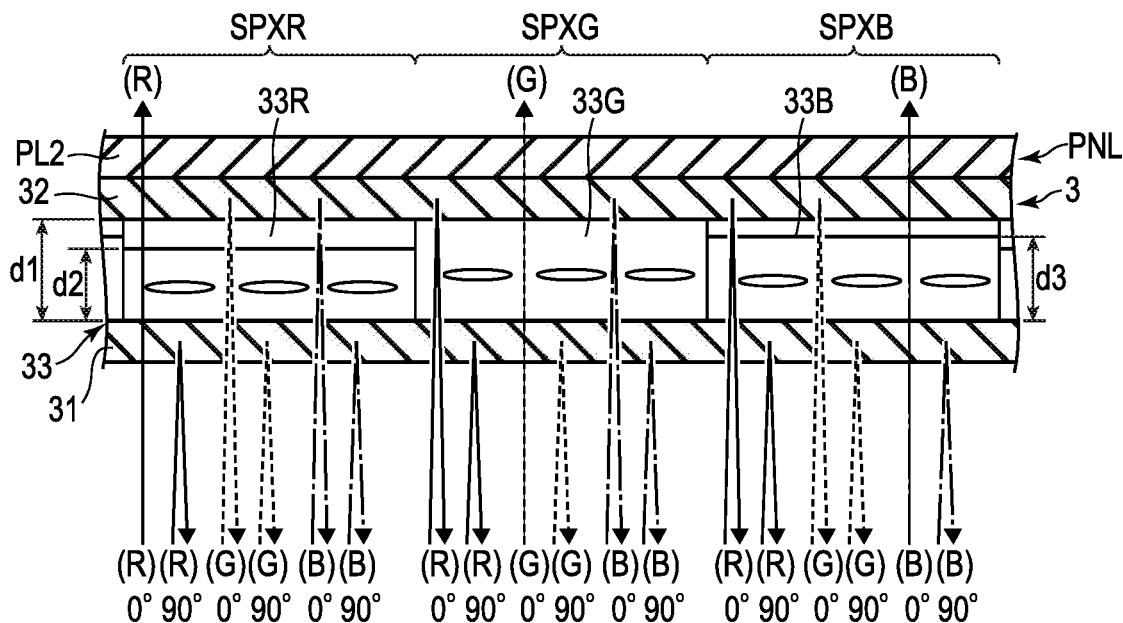
FIG. 4 is a sectional view showing a second modification to the wavelength selection layer shown in FIG. 2.

FIGS. 3 and 4 are sectional views each showing a modification in which the wavelength selection layer 3 is formed of a liquid crystal layer. The driving scheme of the liquid crystal layer of the phase element layer 33 may be of a VA type (homeotropic alignment) as shown in FIGS. 3 and 4 or an IPS type (homogeneous alignment) not shown. The alignment state of the phase element layer 33 can be controlled by the control module CTR or the like.

In the example shown in FIG. 3, the phase element layer 33 is a liquid crystal layer to which a voltage is applied in such a manner that the green phase element 33G transmits a wavelength of 1590 nm, the red phase element 33R transmits a wavelength of 1280 nm, and the blue phase element 33B transmits a wavelength of 1400 nm. The wavelength transmitted is controlled by a voltage to be applied, and the voltage applied to the blue phase element 33B is higher than the voltage applied to the red phase element 33R. The voltage applied to the green phase element 33G is much higher than the voltage applied to the blue phase element 33B.

The phase element layer 33 shown in FIG. 4 is a modification to the example of FIG. 3. In the example of FIG. 4, the thickness of the liquid crystal layer is varied by causing a cell gap to vary among areas of the green phase element 33G, red phase element 33R and blue phase element 33B. Accordingly, the retardation varies with color. Specifically, a cell gap d3 formed in the blue phase element 33B is narrower than a cell gap d1 formed in the green phase element 33G. A cell gap d2 formed in the red phase element 33R is much narrower than the cell gap d3 formed in the blue phase element 33B. This configuration allows each of the phase elements to transmit a desired wavelength with efficiency.

Referring next to FIGS. 3 through 7, the operation of the wavelength selection layer 3 will be described. Note that the red phase element 33R and the blue phase element 33B have substantially the same shape and function as the green phase element 33G, except for the phase difference described so far. Therefore, only the green phase element 33G will be described in detail, and the red phase element 33R or the blue phase element 33B will not be described in detail.

The white light emitted from the emission surface 6A of the light guide 6 contains a green component (G), a red component (R) and a blue component of unpolarized light. When the green component (G) strikes to the first reflective polarizer 31, as shown in FIG. 3, linearly polarized light whose polarization direction is 0° with respect to the polarizing axis of the first reflective polarizer 31 is transmitted, and linearly polarized light whose polarization direction is 90° with respect to the polarizing axis of the first reflective polarizer 31 is reflected to the light guide 6. The linearly polarized light reflected by the first reflective polarizer 31 changes in its polarization degree as it propagates through the light guide 6, and then passes through the first reflective polarizer 31. Thus, the linearly polarized light reflected by the first reflective polarizer 31 is reused.

Similarly, when the red component (R) and the blue component (B) contained in the white light emitted from the emission surface 6A of the light guide 6 strike to the first reflective polarizer 31, the linearly polarized light whose polarization direction is 0° with respect to the polarizing axis of the first reflective polarizer 31 is transmitted, and the linearly polarized light whose polarization direction is 90° with respect to the polarizing axis of the first reflective polarizer 31 is reflected to the light guide 6 and then reused.

When the first and second reflective polarizers 31 and 32 arranged under crossed nicols, the green phase element 33G changes the polarization direction of the green component (G) transmitted through the first reflective polarizer 31 by approximately 90°. On the other hand, the green phase element 33G hardly changes the polarization directions of the red component (R) and the blue component (B) transmitted through the first reflective polarizer 31.

In addition, when the first and second reflective polarizer 31 and 32 are arranged under parallel nicols, the green phase element 33G hardly changes the polarization direction of the green component (G) transmitted through the first reflective polarizer 31. On the other hand, the green phase element 33G changes the polarization directions of the red component (R) and the blue component (B) transmitted through the first reflective polarizer 31 by approximately 90°.

As a result, the polarization state of the white light incident on the green phase element 33G is so changed that the green component (G) is transmitted through the second reflective polarizer 32 and the red component (R) and the blue component (B) are reflected by the second reflective polarizer 32. The red component (R) and the blue component (B) reflected by the second reflective polarizer 32 are transmitted through the green phase element 33G and the first reflective polarizer 31, returned to the light guide 6, and reused.

The red component (R) and the blue component (B) reflected by the green pixel SPXG move in the width direction of the sub-pixel SPX in an optical path to which the components strike and from which they are emitted again. The reused red component (R) and blue component (B) strike to a sub-pixel SPX (e.g., the red pixel SPXR) other than the reflected sub-pixel SPX.

Similarly to the green phase element 33G, the red phase element 33G changes the polarization state of incident light such that the red component (R) is transmitted through the second reflective polarizer 32 and the blue component (B) and the green component (G) are reflected by the second reflective polarizer 32. The blue phase element 33B changes the polarization state of incident light such that the blue component (B) is transmitted through the second reflective polarizer 32 and the green component (G) and the red component (R) are reflected by the second reflective polarizer 32.

According to the present embodiment, in the green pixel SPXG, the red component (R) and the blue component (B), which are absorbed by the green filter 22G upon striking to the green filter 6 without being used for displaying an image, can positively be reflected to the light guide 6 for reuse. Similarly, light can be reused for the red pixel SPXR and the blue pixel SPXB.

FIG. 5 is a graph schematically showing transmission characteristics of the wavelength selection layer 3 and the green filter 22G in the green pixel SPXG. The solid line indicates transmission characteristics of the wavelength selection layer 3 (first reflective polarizer 31, phase element 33G and second reflective polarizer 32) superposed on the green pixel SPXG, and the broken line indicates transmission characteristics of the green filter 22G.

When the green component (G), the red component (R) and the blue component (B) are, for example, laser beams whose wavelengths are 530 nm, 630 nm and 470 nm, respectively, the transmittance of the green component (G) incident on the wavelength selection layer 3 superposed on the green pixel SPXG is about 1 (about 100%), the transmittance of the red component (R) is about 0 (about 0%), and the transmittance of the blue component (B) is about 0.1 (about 10%), as shown in FIG. 5.

That is, the wavelength selection layer 3 superposed on the green pixel SPXG changes the incident light such that the transmittance of the red and blue components (R) and (B) becomes lower than that of the green component (G). The green component (G) incident on the green phase element 33G is transmitted through the green filter 22G and used for displaying an image.

On the other hand, about 1 (about 100%) of the red component (R), which is incident on the green phase element 33G, is reflected by the second reflective polarizer 32. Though there is a possibility that part of the red component (R) will be emitted from the second reflective polarizer 32, it is also reflected by the first reflective polarizer 31 and thus substantially 100% of the red component (R) is reflected toward the light guide 6 for reuse. Similarly, about 0.9 (about 90%) of the blue component (B), which is incident on the green phase element 33G, is reflected by the second reflective polarizer 32, while the remaining blue component (B) transmitted through the second reflective polarizer 32 is also reflected by the first reflective polarizer 31 for reuse. When the first and second reflective polarizers 31 and 32 are formed of the same material, a blue component (B) of 0.9+(0.1×0.9)≈0.99 (about 99%) is reflected toward the light guide 6.

FIG. 6 is a graph schematically showing transmission characteristics of the wavelength selection layer 3 and the red filter 22R in the red pixel SPXR. The solid line indicates transmission characteristics of the wavelength selection layer 3 (first reflective polarizer 31, phase element 33R and second reflective polarizer 32) superposed on the red pixel SPXR, and the broken line indicates transmission characteristics of the red filter 22R.

When the green component (G), the red component (R) and the blue component (B) are, for example, laser beams whose wavelengths are 530 nm, 630 nm and 470 nm, respectively, the transmittance of the green component (G) incident on the wavelength selection layer 3 superposed on the red pixel SPXR is about 0.1 (about 10%), the transmittance of the red component (R) is about 1 (about 100%), and the transmittance of the blue component (B) is about 0.5 (about 50%), as shown in FIG. 6.

That is, the wavelength selection layer 3 superposed on the red pixel SPXR changes the incident light such that the transmittance of the blue and green components (B) and (G) becomes lower than that of the red component (R). The red component (R) incident on the red phase element 33R is transmitted through the red filter 22G and used for displaying an image.

On the other hand, about 5 (about 50%) of the blue component (B), which is incident on the red phase element 33R, is reflected by the second reflective polarizer 32. Since the remaining blue component (R) is also reflected by the first reflective polarizer 31, a blue component (B) of 0.5+(0.5×0.5)≈0.75 (about 75%) is reflected toward the light guide 6 for reuse. Similarly, about 0.9 (about 90%) of the green component (G), which is incident on the red phase element 33R, is reflected by the second reflective polarizer 32. Since the other green component (G) is also reflected by the first reflective polarizer 31, a green component (G) of 0.9+(0.1×0.9)≈0.99 (about 99%) is reflected toward the light guide 6 for reuse.

Figure 7:
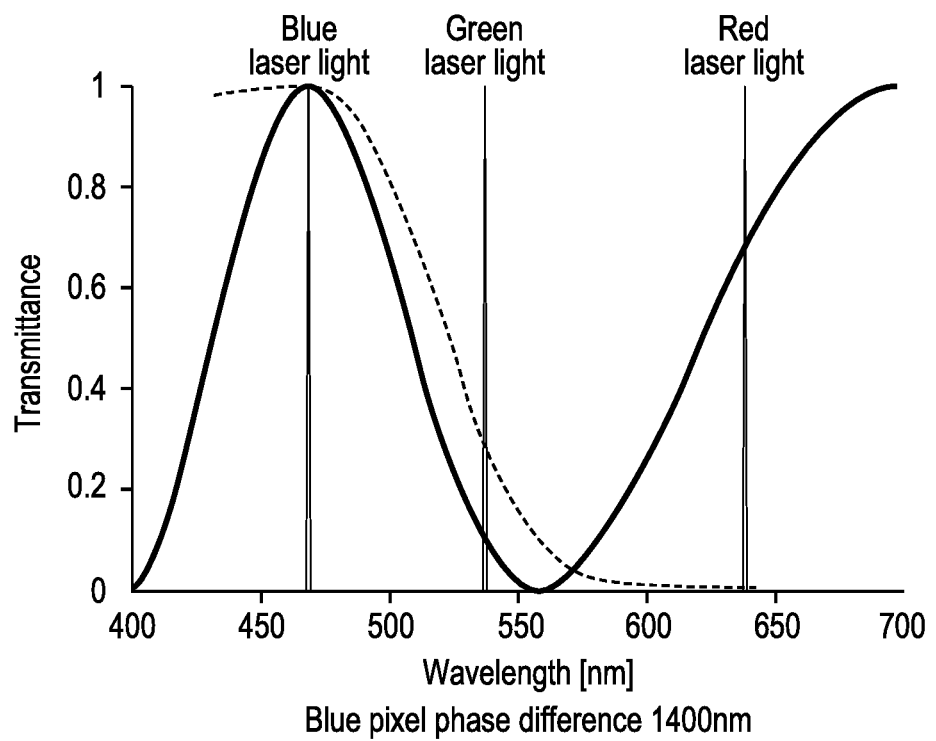
FIG. 7 is a graph schematically showing transmission characteristics of a blue filter and a wavelength selection layer in a blue pixel.

FIG. 7 is a graph schematically showing transmission characteristics of the wavelength selection layer 3 and the blue filter 22B in the blue pixel SPXB. The solid line indicates transmission characteristics of the wavelength selection layer 3 (first reflective polarizer 31, phase element 33R and second reflective polarizer 32) superposed on the blue pixel SPXB, and the broken line indicates transmission characteristics of the blue filter 22B.

When the green component (G), the red component (R) and the blue component (B) are, for example, laser beams whose wavelengths are 530 nm, 630 nm and 470 nm, respectively, the transmittance of the green component (G) incident on the wavelength selection layer 3 superposed on the blue pixel SPXB is about 0.1 (about 10%), the transmittance of the red component (R) is about 0.7 (about 70%), and the transmittance of the blue component (B) is about 1 (about 100%), as shown in FIG. 7.

That is, the wavelength selection layer 3 superposed on the blue pixel SPXB changes the incident light such that the transmittance of the green and red components (G) and (R) becomes lower than that of the blue component (B). The blue component (B) incident on the blue phase element 33B is transmitted through the blue filter 22B and used for displaying an image.

On the other hand, about 0.9 (about 90%) of the green component (G), which is incident on the blue phase element 33B, is reflected by the second reflective polarizer 32. The remaining green component (G) is reflected toward the light guide 6 by the first reflective polarizer 31 for reuse. When the first and second reflective polarizers 31 and 32 are formed of the same material, a green component (G) of $0.9+(0.9\times0.1)\approx0.99$ (about 99%) is reflected toward the light guide 6. Similarly, about 0.3 (about 30%) of the red component (R), which is incident on the blue phase element 33B, is reflected by the second reflective polarizer 32. The remaining red component (R) is reflected toward the light guide 6 by the first reflective polarizer 31 for reuse. When the first and second reflective polarizers 31 and 32 are formed of the same material, a red component (R) of $0.7+(0.3\times0.7)\approx0.91$ (about 91%) is reflected toward the light guide 6.

According to the liquid crystal display device DSP of the present embodiment configured as described above, the red and blue components (R) and (B), which are absorbed without being used for displaying an image upon striking to the green filter 22G, the blue and green components (B) and (G), which are absorbed without being used for displaying an image upon striking to the red filter 22R, and the green and red components (G) and (R), which are absorbed without being used for displaying an image upon striking to the blue filter 22B, can positively be reflected toward the light guide 6 for reuse.

The power consumption of the illumination device BL can be saved because the use efficiency of light is improved. When the liquid crystal display device DSP receives power from a battery, its operating time can be extended. In addition, the amount of light of the display panel PNL can be increased, and the display quality of the liquid crystal display device DSP can be improved.

In the present embodiment, light not used for displaying an image is reflected by the wavelength selection layer 3 and hardly strikes to the color filter layer 22. Since the amount of light of the display panel PNL decreases when the transmission band of the color filter layer 22 is narrowed, the transmission bands of the green filter 22G, red filter 22R and blue filter 22B are generally overlapped. In particular, the transmission band of the blue filter 22B is often extended to a green wavelength range as shown in FIG. 7. When a green component (G) strikes to the blue filter 22B, the color becomes dirty due to a color mixture.

In the present embodiment, however, a green component (G) with high color purity strikes to the green pixel SPXG, a red component (R) with high color purity strikes to the red pixel SPXR, and a blue component (B) with high color purity strikes to the blue pixel SPXB. Since light with high color purity strikes to each sub-pixel SPX, a color mixture can be prevented in the color filter layer 22 to reproduce vivid colors. As a result, the liquid crystal display device DSP is improved in its display quality.

The present embodiment is provided with laser elements 5G, 5R and 5B which emit green laser light, red laser light and blue laser light. The bandwidth of laser light emitted from a laser semiconductor and the like is much narrower than that of light emitted from an LED and the like. Since the refractive index depends upon the wavelength, the directions of polarized light that strikes to the second reflective polarizer 32 vary as the bandwidths of the green, red and blue components (G), (R) and (B) increase. Though the wavelength selection layer 3 according to the present embodiment can be applied to light whose bandwidth is larger than that of laser light, the light is reflected by the second reflective polarizer 32 and its reuse is decreased as the bandwidth of each color increases In the present embodiment, since the green, red and blue components (G), (R) and (B) are laser light, they can be sorted with efficiency. Thus, light that is not used for display can be reused to the maximum to improve use efficiency of light. A color mixture in the color filter layer 22 can be minimized to enhance color reproducibility.

In the liquid crystal display device DSP of each of the first and second modifications shown in FIGS. 3 and 4, the phase element layer 33 is a liquid crystal layer. When the phase element layer 33 is formed of a liquid crystal layer, not only the green, red and blue components (G), (R) and (B) can selectively be transmitted, but also all of the components can be shielded from light without being transmitted. Since leakage of light from the liquid crystal layer LC close to the display panel PNL can be reduced, contrast can be improved.

A liquid crystal display device is devised in which two liquid crystal panels are stacked on each other for the purpose of improving image contrast. In this liquid crystal display device, the configuration of the first modification to the embodiment shown in FIG. 3 can be obtained by replacing two absorption polarizer in the liquid crystal panel on the back side with their respective reflective polarizers 31 and 32 and configuring the control module of the display panel on the back side so as to output a signal for causing the liquid crystal layer to function as the phase elements 33G, 33R and 33B. In this case, it is possible to add a function of selecting and transmitting the green (G), red (R) and blue components (B), which brings about significant advantages unique to the first modification, without incurring a large additional cost.

Alternatively, in a liquid crystal display device in which two liquid crystal panels are stacked on each other, the configuration of the second modification to the embodiment shown in FIG. 4 can be obtained by replacing two absorption polarizers in the liquid crystal panel on the back side with their respective reflective polarizers 31 and 32 and forming the cell gaps of the sub-pixels SPXG, SPXR and SPXB in the foregoing cell gaps d1, d2 and d3, respectively. In this case, too, it is possible to add a function of selecting and transmitting the green (G), red (R) and blue components (B), which brings about significant advantages unique to the second modification, without incurring a large additional cost. In addition, various suitable advantages can be obtained from the present embodiment and its modifications.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The configurations disclosed in the embodiments can be combined as appropriate.

For example, the configuration of the pixels PX may further include a sub-pixel SPX corresponding to white or the like, or may include a plurality of sub-pixels SPX corresponding to the same color. When the pixels PX include a white pixel, a phase element corresponding to the white pixel provides a phase difference such that the green component (G), red component (R) and blue component (B) are all transmitted through the second reflective polarizer 32.

What is claimed is:

1. A display device comprising:
   a color filter layer;
   an illumination device which illuminates the color filter layer with mixed color light including a first color component and a second color component; and
   a wavelength selection layer interposed between the illumination device and the color filter layer,
   wherein:
   the color filter layer includes a first color filter which transmits the first color component and absorbs the second color component and a second color filter which transmits the second color component and absorbs the first color component;
   the wavelength selection layer includes a phase element layer, a first polarizer interposed between the illumination device and the phase element layer, and a second polarizer interposed between the phase element layer and the color filter layer;
   the phase element layer includes a first color phase element located in a position corresponding to the first color filter and a second color phase element located in a position corresponding to the second color filter;
   the first color phase element changes a polarization state of the mixed color light, which strikes to the first phase element through the first polarizer, such that the first color component is transmitted through the second polarizer; and
   the second color phase element changes a polarization state of the mixed color light, which strikes to the second phase element through the first polarizer, such that the second color component is transmitted through the second polarizer.

2. The display device of claim 1, wherein the phase element layer includes phase plates of different phase differences which are formed in the first color phase element and the second color phase element, respectively.

3. The display device of claim 1, wherein the phase element layer is a first liquid crystal layer in which different voltages are applied to the first color phase element and the second color phase element, respectively.

4. The display device of claim 1, wherein the phase element layer is a first liquid crystal layer in which different cell gaps are formed in the first color phase element and the second color phase element, respectively.

5. The display device of claim 1, wherein the first polarizer and the second polarizer are reflective polarizers which transmit light of a predetermined phase and reflect other light.

6. The display device of claim 5, wherein:
   the first color component is a green component, and the second color component is a red component;
   the first color filter is a green filter which transmits the green component and absorbs other color components;
   the second color filter is a red filter which transmits the red component and absorbs other color components;
   the first phase element is a green phase element which transmits the green component and reflects other color components; and
   the second phase element is a red phase element which transmits the red component and reflects other color components.

7. The display device of claim 6, wherein:
   the color filter layer further includes a third color filter, and the third color filter is a blue filter which transmits a blue component and absorbs other color components;
   the phase element layer further includes a third color phase element, and the third color phase element is a blue phase element located in a position corresponding to the third color filter; and
   the blue phase element absorbs the blue component and reflects other color components.

8. The display device of claim 7, wherein the illumination device includes a green laser light source, a red laser light source, and a blue laser light source.

9. The display device of claim 7, wherein the green phase element has a phase difference of 1590 nm, the red phase element has a phase difference of 1280 nm, and the blue phase element has a phase difference of 1400 nm.

10. The display device of claim 1, wherein:
    the display device comprises a first substrate, a second substrate, and a second liquid crystal layer interposed between the first substrate and the second substrate;
    the color filter layer is formed between the second substrate and the second liquid crystal layer; and
    the first substrate is interposed between the second liquid crystal layer and the first polarizer.

11. The display device of claim 10, wherein the first substrate is a substrate formed of resin.

12. The display device of claim 10, wherein the first substrate is a substrate formed of glass.

13. The display device of claim 10, wherein:
    the display device further comprises a pair of polarizers; and
    the first substrate, the second substrate and the second liquid crystal layer are interposed between the polarizers.

14. The display device of claim 7, wherein:
    the display device comprises a plurality of pixels arranged in a display area; and
    the pixels include a first sub-pixel with the first color filter, a second sub-pixel with the second color filter, and a third sub-pixel with the third color filter.

15. The display device of claim 1, wherein the wavelength selection layer further includes a light-shielding layer interposed between the first color phase element and the second color phase element.

16. The display device of claim 7, wherein the wavelength selection layer further includes a light-shielding layer interposed between the first color phase element and the second color phase element and a light-shielding layer interposed between the first color phase element and the third color phase element.

17. The display device of claim 7, wherein:
    the phase element layer is a first liquid crystal layer in which different voltages are applied to the first color phase element, the second color phase element and the third color phase element; and the voltage applied to the first color phase element is higher than the voltage applied to the third color phase element.

18. The display device of claim 17, wherein the voltage applied to the third color phase element is higher than the voltage applied to the second color phase element.

19. The display device of claim 7, wherein:
the phase element layer is a first liquid crystal layer in which different cell gaps are formed in the first color phase element, the second color phase element and the third color phase element; and
the cell gap in the third color phase element is narrower than the cell gap in the first color phase element.

20. The display device of claim 19, wherein the cell gap in the second color phase element is narrower than the cell gap in the third color phase element.

* * * * *